(12) United States Patent
Diaz et al.

(10) Patent No.: US 8,078,795 B2
(45) Date of Patent: Dec. 13, 2011

(54) METHODS AND MEDIA FOR WRITING DATA TO FLASH MEMORY

(75) Inventors: Juan Francisco Diaz, Round Rock, TX (US); Anand Joshi, Round Rock, TX (US); Samer El-Haj-Mahmoud, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 792 days.

(21) Appl. No.: 12/024,103

(22) Filed: Jan. 31, 2008

(65) Prior Publication Data
US 2009/0198870 A1 Aug. 6, 2009

(51) Int. Cl.
*G06F 13/00* (2006.01)
(52) U.S. Cl. .................. 711/103; 711/E12.001
(58) Field of Classification Search .......... None
See application file for complete search history.

(56) References Cited

U.S. PATENT DOCUMENTS

| | | | |
|---|---|---|---|
| 5,650,962 A | 7/1997 | Arase | |
| 6,292,868 B1 * | 9/2001 | Norman | 711/103 |
| 6,671,212 B2 | 12/2003 | Macri et al. | |
| 7,260,016 B2 | 8/2007 | Kouno | |
| 2006/0015677 A1 * | 1/2006 | Gongwer et al. | 711/103 |
| 2006/0259716 A1 | 11/2006 | Moschopoulos | |
| 2009/0043944 A1 * | 2/2009 | Chainer | 711/100 |

* cited by examiner

*Primary Examiner* — Pierre-Michel Bataille
*Assistant Examiner* — John P Fishburn
(74) *Attorney, Agent, or Firm* — Garrana Tran LLP; Andrea E. Tran

(57) ABSTRACT

A method for writing bytes to flash memory is disclosed herein whereby the method comprising includes counting bytes from a data source, the bytes associated with a first value and a second value and comparing a number of bytes associated with the first value with a number of bytes associated with the second value. The method may further include inverting the bytes in the case where the number of bytes associated with the first value is greater than the number of bytes associated with the second value and transferring the bytes not associated with the second value to the flash memory.

18 Claims, 2 Drawing Sheets

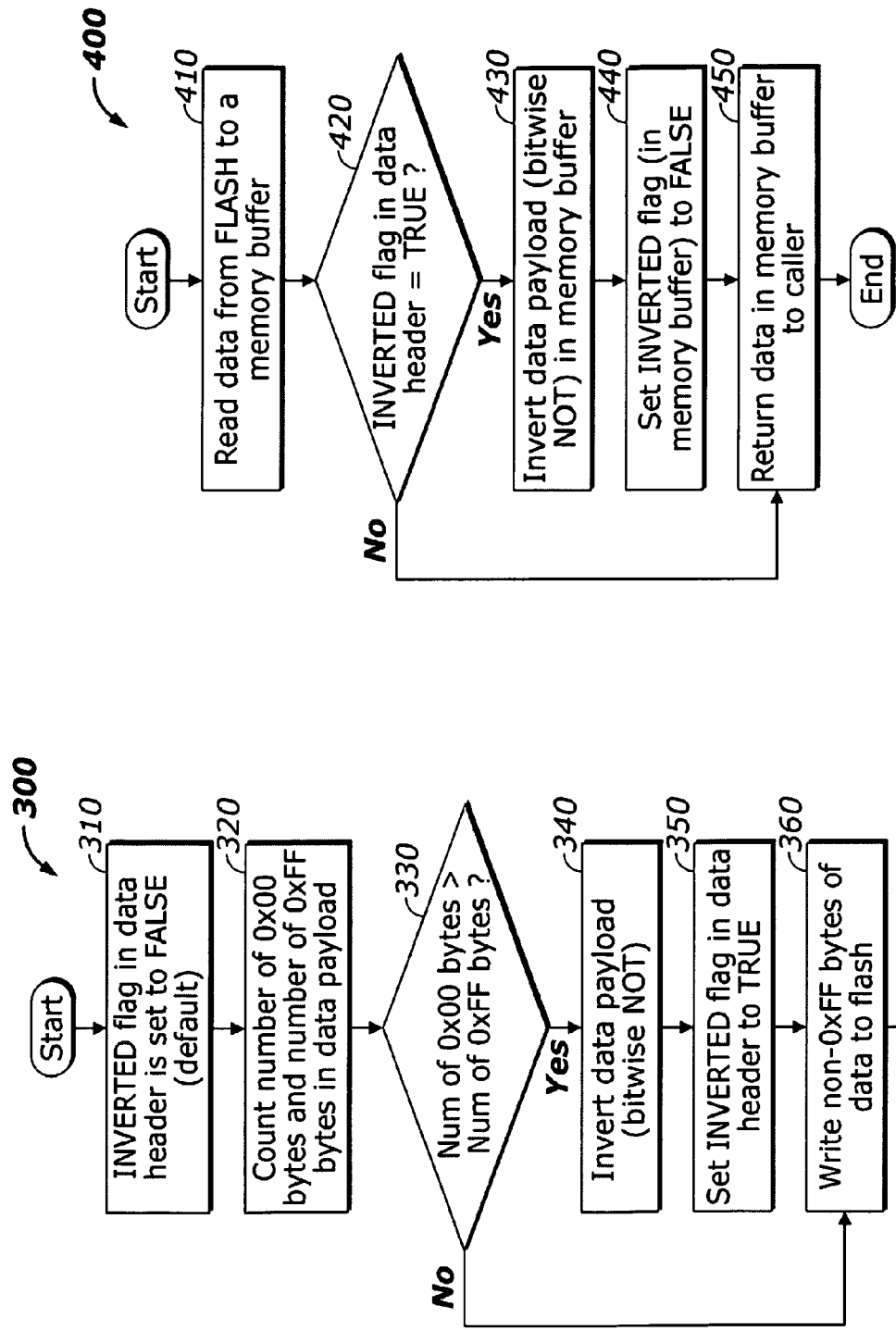

METHODS AND MEDIA FOR WRITING DATA TO FLASH MEMORY

BACKGROUND

1. Technical Field

The present disclosure relates generally to the field of information handling systems. More specifically, but without limitation, the present disclosure relates to flash memory.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) may use persistent onboard storage to store various system data, such as system configuration data, UEFI variables, error logs, performance monitoring logs and the like. Storage of this information may be provided by system firmware or basic input-output system (BIOS) using defined application programming interfaces (APIs). This data is persistent and is needed to be preserved when power to an IHS is discontinued such as during a boot or shutdown. Therefore, such data needs to be saved to onboard non-volatile memory, commonly in the form of system flash memory.

Writing data to any flash memory device or system, however, may be a time consuming process. In some instances, the process of writing data to flash memory may require at least 5 to 7 microseconds (ms) for writing each byte of data. Therefore, writing such data to flash may take considerable time depending on the size of the data. Thus, a need exists for methods, apparatus and media for improving data write speed to flash memory.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for writing bytes to flash memory wherein the method includes counting bytes from a data source, the bytes associated with a first value and a second value and comparing a number of bytes associated with the first value with a number of bytes associated with the second value. The method may further include inverting the bytes in the case where the number of bytes associated with the first value is greater than the number of bytes associated with the second value and transferring the bytes not associated with the second value to the flash memory.

Another aspect of the disclosure provides a computer-readable medium having executable instructions for performing a method include the steps of counting bytes from a data source, the bytes associated with a first value and a second value and comparing a number of bytes associated with the first value with a number of bytes associated with the second value. The computer-readable medium may further have executable instructions for performing the steps of inverting the bytes in the case where the number of bytes associated with the first value is greater than the number of bytes associated with the second value and transferring the bytes not associated with the second value to the flash memory.

Yet another illustrative aspect of the disclosure provides a storage device comprising a storage medium and a controller, wherein the controller performs an algorithm including the steps of counting bytes from a data source, the bytes associated with a first value and a second value, comparing a number of bytes associated with the first value with a number of bytes associated with the second value, inverting the bytes in the case where the number of bytes associated with the first value is greater than the number of bytes associated with the second value and transferring the bytes not associated with the second value to the flash memory.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein:

FIG. 3 represents an illustrative method for writing data to flash memory; and FIG. 4 represents an illustrative method for reading data from flash memory.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Portions of the present disclosure, detailed description and claims may be presented in terms of logic, software or software implemented aspects typically encoded on a variety of media or medium including, but not limited to, computer-readable media, machine-readable media, program storage media or computer program product. Such media may be handled, read, sensed and/or interpreted by an IHS (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Figure 1:
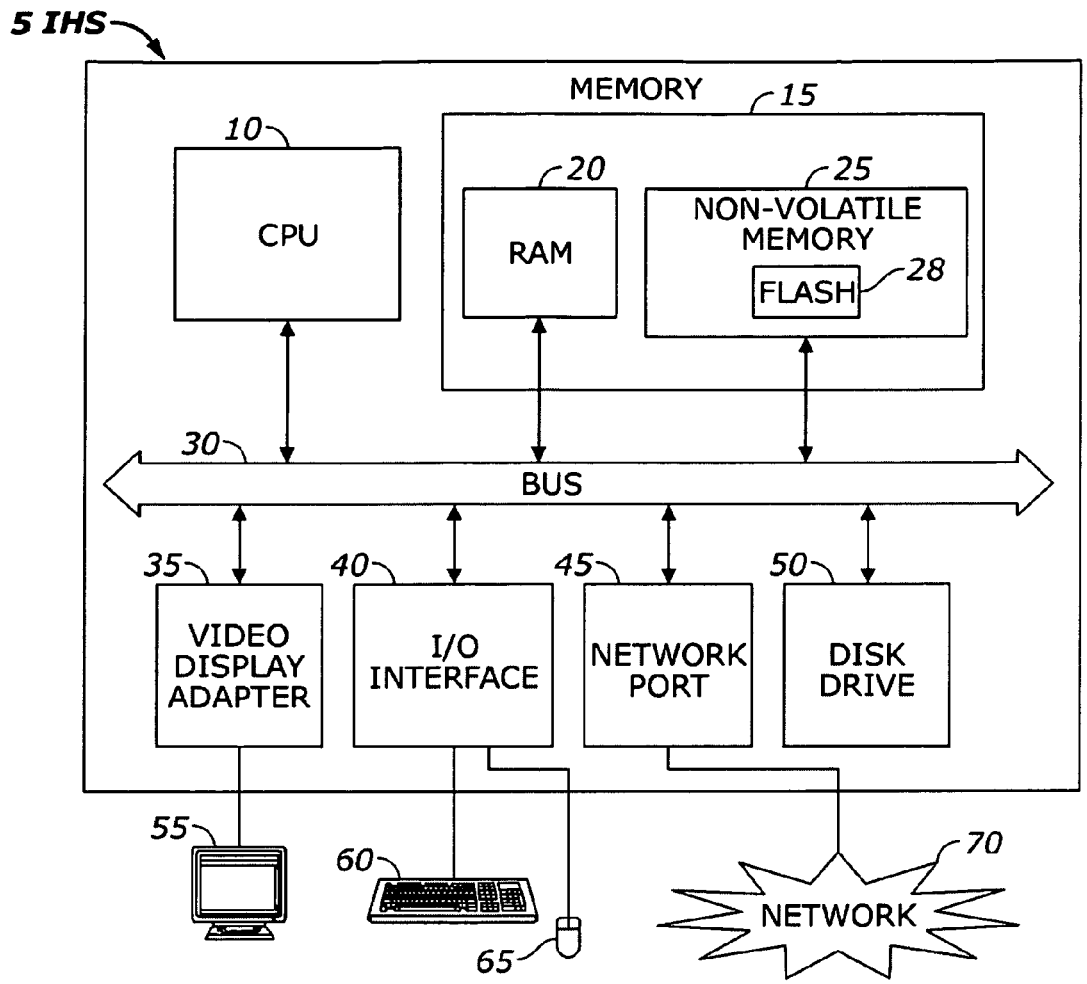
FIG. 1 represents an illustrative schematic of an information handling system (IHS) in accord with the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory 28, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Flash memory 28 is a type of non-volatile memory that can be electrically erased and reprogrammed. It may be utilized for various purposes including, but not limited to, general storage or to transfer data between IHSs and/or other electronic devices. Flash memory 28 may also be used in flash devices such as Universal Serial Bus (USB) flash drives, memory cards/sticks, jump drives or the like. By way of example and not limitation, applications involving flash memory may include IHSs, portable IHSs or laptop computers, digital cameras, mobile phones, portable audio players and personal digital assistants (PDAs). Although the present disclosure relates to flash memory devices, it is appreciated by those skilled in the art that flash file systems such as Journaling Flash File System (JFFS) or Yet Another Flash File System (YAFFS) may also benefit from this disclosure.

Figure 2:
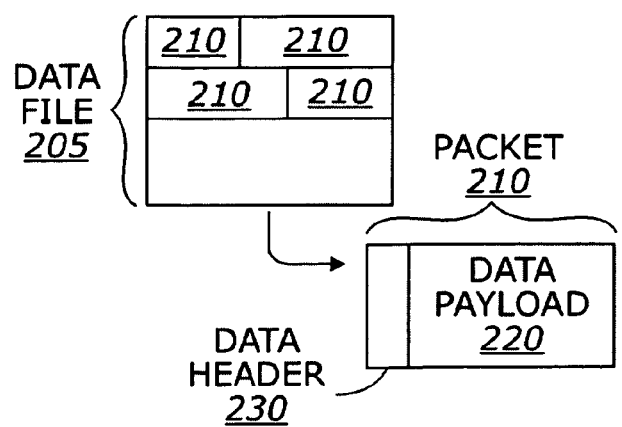
FIG. 2 represents an illustrative schematic of a data files in accord with the present disclosure.

Referring now to FIG. 2 is a representation of one possible arrangement of a data file 205 which may be written and/or transferred to/from flash memory 28. All types of data files 205 processed herein including, but not limited to, non-volatile logs, error logs, debug logs and unified extensible firmware interface (UEFI), may include at least one packet 210. A packet 210 may consist of portions including a payload 220 and a header 230. As used in the present disclosure, the "payload" may be referred to as the essential information, blocks of data or a body carried within a packet or other transmission unit. The payload 220 may include the blocks of data in units such as bits or bytes (8 bites) that may eventually be received by an end user or target, such as flash memory. The size of the payload 220 may vary according to the type of data file 205 or packet 210 processed and may exist, by way of example, as fixed or variable size. For purposes of illustration only, a data file 205 may be 50 bytes, 100 bytes or any conventional size.

Still referring to FIG. 2, a "header" 230 may refer to supplemental information placed at an end, such as the beginning, of the payload 220. The header 230 may contain information for the handling of the payload 220. Other information contained in the header 230 may include the size of the payload 220, flags, the status of inverted data and the like.

Referring now to FIG. 3, an illustrative method for writing data to flash memory is indicated generally at 300. The discussion below is intended to illustrate one possible implementation of the present disclosure using a method for writing data to flash memory. It should be appreciated that a number of other methods may be utilized for writing such data to flash memory employing a number of different steps and that all such variations may be included within the scope of the present disclosure. Furthermore, various methods are contemplated comprising all or less than all of the steps discussed herein and any number of repeats of any of the steps below.

Data from any data source, storage medium or memory buffer, such as a hard disk drive, CD ROM or the like, may be prepared and read to be written to flash memory. The data to be processed may further be accessible through a managed interface, such as an application programming interface (API) or source code interface provided by the system firmware. During the process of writing data, flash memory may be written or programmed in increments of bytes or bits. By way of example only, some bits are set to zero on the flash memory depending on the data being written. Conversely, erasing data from flash memory may involve erasing entire blocks of data such that, for example, all the bits are set to 1 or 0 depending on the type of flash memory being used.

Continuing with FIG. 3, an algorithm reads data from a source whereby the data includes the header and payload as discussed previously. In step 310, the header may include an inverted flag set to a default setting to indicate that data has not yet been inverted. In one possible implementation, a default setting for a header may be an inverted flag set to "FALSE". In step 320, the algorithm evaluates the payload one byte at a time and counts the number of bytes that are equal to a first value (e.g., 0x00) and the number of bytes equal to a second value (e.g., 0xFF). As appreciated by one skilled in the art, a byte equal to 0x00 or 00 may comprise a series of bits of binary value of zeros whereas a byte equal to 0xFF or FF may comprise bits of binary values of ones. The count performed by the algorithm may be a temporary value and stored in a location which is implementation specific. For purposes of illustration only, a count may be stored in RAM or in a general purpose register inside the CPU. In another possible implementation, a count may be stored in the header, becoming a permanent value for a predetermined purpose. In step 330, the algorithm determines whether the number of bytes equal to 0x00 exceed the number of bytes equal to 0xFF. In the case that the number of 0x00 bytes does not exceed the number of 0xFF bytes, inversion (to be described below) of the payload does not occur.

Thus, method 300 resumes at step 360 whereby the algorithm writes non-0xFF bytes to flash memory. During this step, data whether inverted or in its original format, is written bypassing all bytes equal to 0xFF. It is eventually in step 360, that data from a memory source is written or transferred to flash memory. Therefore, the present disclosure contemplates that all preparation or manipulation of data including counting and/or inverting bytes precede the transfer, writing or acquisition of bytes to flash memory.

Still referring to FIG. 3, if it is determined in step 330 that the number of 0x00 bytes exceeds the number of 0xFF bytes, the algorithm will perform a payload inversion in step 340. As used herein, an "inversion" may refer to a logical NOT, bitwise inversion or bitwise NOT operation in which a binary value is given its alternative value. Therefore, within the payload a bit having a binary value of one is converted to zero while a zero is converted to one. By way of example only, in the case of NAND flash, all bits are converted to one or bytes are converted to FFs during the inversion. In the case of NOR FLASH, the inversion process converts all bits to zeros or 00s. In step 350, the algorithm resets a flag in the header to indicate that the payload has been inverted. In one possible implementation, following the inversion of the payload, an inverted flag in a header may be changed to "TRUE" from the default setting of "FALSE". Then as previously discussed, step 360 occurs in which data, whether inverted or in its original format, is written while all bytes equal to 0xFF are ignored.

Now referring to FIG. 4, an illustrative method for reading data from flash memory is indicated generally at 400. In step 410, the algorithm may read data from flash memory to a memory buffer or any suitable target one packet at a time including the header and payload. In step 420, it is determined whether the inverted flag in the header is set to "TRUE" which may indicate the payload has been inverted from its original format. If the flag is set to TRUE in step 420, the bytes in the payload may be inverted into a memory buffer in step 430. The inversion process described previously (e.g., bitwise NOT) occurs at this step. Following the inversion of the payload, an inverted flag in a header may be changed to "FALSE" from a previous setting of "TRUE" in step 440. Finally, in step 450, data in the memory buffer is returned to a caller, such as an end user or a target which requested that the data be read from flash memory.

The methods disclosed herein may improve the speed in which a flash memory device or system may acquire data by reducing the number of byte writes to flash. This may apply particularly in the case of data which consists of a greater number of 0x00 bytes compared to 0xFF bytes such as, for example, uncompressed data and UNICODE text. The inversion of 0x00 bytes may result in 0xFF bytes which are not written to flash. This reduces the occurrence of byte writes and thus, the time in which data is transferred or acquired by flash memory. Therefore, the algorithm improves the speed in which flash may acquire date by modifying the data so that there are more 0xFF bytes, which do not need to be written, as compared to 0x00 bytes.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein. Furthermore, the present disclosure contemplates all possible implementations, now known or hereafter developed, in which data is efficiently written to flash memory whereby the counting and inverting of bytes occur prior to data transfer.

What is claimed is:

1. A method for writing data to flash memory, the method comprising:
   counting bytes of the data to determine number of the bytes equal to a first value and a second value, wherein the first value and the second value are equal to a binary value of zeros or a binary value of ones;
   comparing the number of bytes equal to the first value with the number of bytes equal to the second value;
   inverting the bytes in the case where the number of bytes equal to the first value is greater than the number of bytes equal to the second value; and
   transferring the bytes of the data not equal to the second value to the flash memory.

2. The method of claim 1, wherein the first value is 0x00 and the second value is 0xFF.

3. The method of claim 2, wherein the data comprise a header and a payload.

4. The method of claim 3, further comprising setting an inversion flag in the header in the case where the number of bytes equal to the first value is greater than the number of bytes equal to the second value.

5. The method of claim 1, wherein the flash memory resides in a flash device or flash file system.

6. The method of claim 5, wherein the flash device or flash file system may be selected from a group consisting of Universal Serial Bus (USB) flash drive, memory cards, Journalling Flash File System (JFFS) and Yet Another Flash File System (YAFFS).

7. A computer-readable medium having executable instructions for performing a method comprising:
   counting bytes of data to determine number of the bytes equal to a first value and a second value, wherein the first value and the second value are equal to a binary value of zeroes or a binary value of ones;
   comparing the number of bytes equal to the first value with the number of bytes equal to the second value;
   inverting the bytes in the case where the number of bytes equal to the first value is greater than the number of bytes equal to the second value; and
   transferring the bytes of data not equal to second value to the flash memory.

8. The computer-readable medium of claim 7, wherein the first value is 0x00 and the second value is 0xFF.

9. The computer-readable medium of claim 8, wherein the data comprise a header and a payload.

10. The computer-readable medium of claim 9, further comprising executable instructions for setting an inversion flag in the header in the cas where the number of bytes equal to the first value is greater than the number of bytes equal to the second value.

11. The computer-readable medium of claim 7, wherein the flash memory resides in a flash device or flash file system.

12. The computer-readable medium of claim 11, wherein the flash device or flash file system may be selected from a group consisting of Universal Serial Bus (USB) flash drive, memory cards, Journalling Flash File System (JFFS) and Yet Another Flash File System (YAFFS).

13. A storage device comprising:
   a storage medium; and a controller, wherein the controller performs an algorithm comprising the steps of:

counting bytes of data to determine number of the bytes equal to a first value and a second value, wherein the first value and the second value are equal to a binary value of zeros or a binary value of ones;

comparing the number of bytes equal to the first value with the number of bytes equal to the second value;

inverting the bytes in the case where the number of bytes equal to the first value is greater than the number of bytes equal to the second value; and transferring the bytes of the data not equal to the second value to the flash memory.

14. The storage device of claim 13, wherein the first value is 0x00 and the second value is 0xFF.

15. The storage device of claim 14, wherein the data comprise a header and a payload.

16. The storage device of claim 14, wherein the controller performs an algorithm further comprising the step of setting an inversion flag in the header in the case where the number of bytes equal to the first value is greater than the number of bytes equal to the second value.

17. The storage device of claim 13, wherein the flash memory resides in a flash device or flash file system.

18. The storage device of claim 1, wherein the flash device or flash file system may be selected from a group consisting of Universal Serial Bus (USB) flash drive, memory cards, Journalling Flash File System (JFFS) and Yet Another Flash File System (YAFFS).

* * * * *